Dec. 12, 1939.   A. CALLENDER ET AL   2,183,235
AUTOMATIC CONTROL OF VARIABLE PHYSICAL CHARACTERISTICS
Filed March 3, 1936   5 Sheets-Sheet 1

Inventors
Albert Callender
Allan Brown Stevenson.

By Roy F. Steward
Attorney

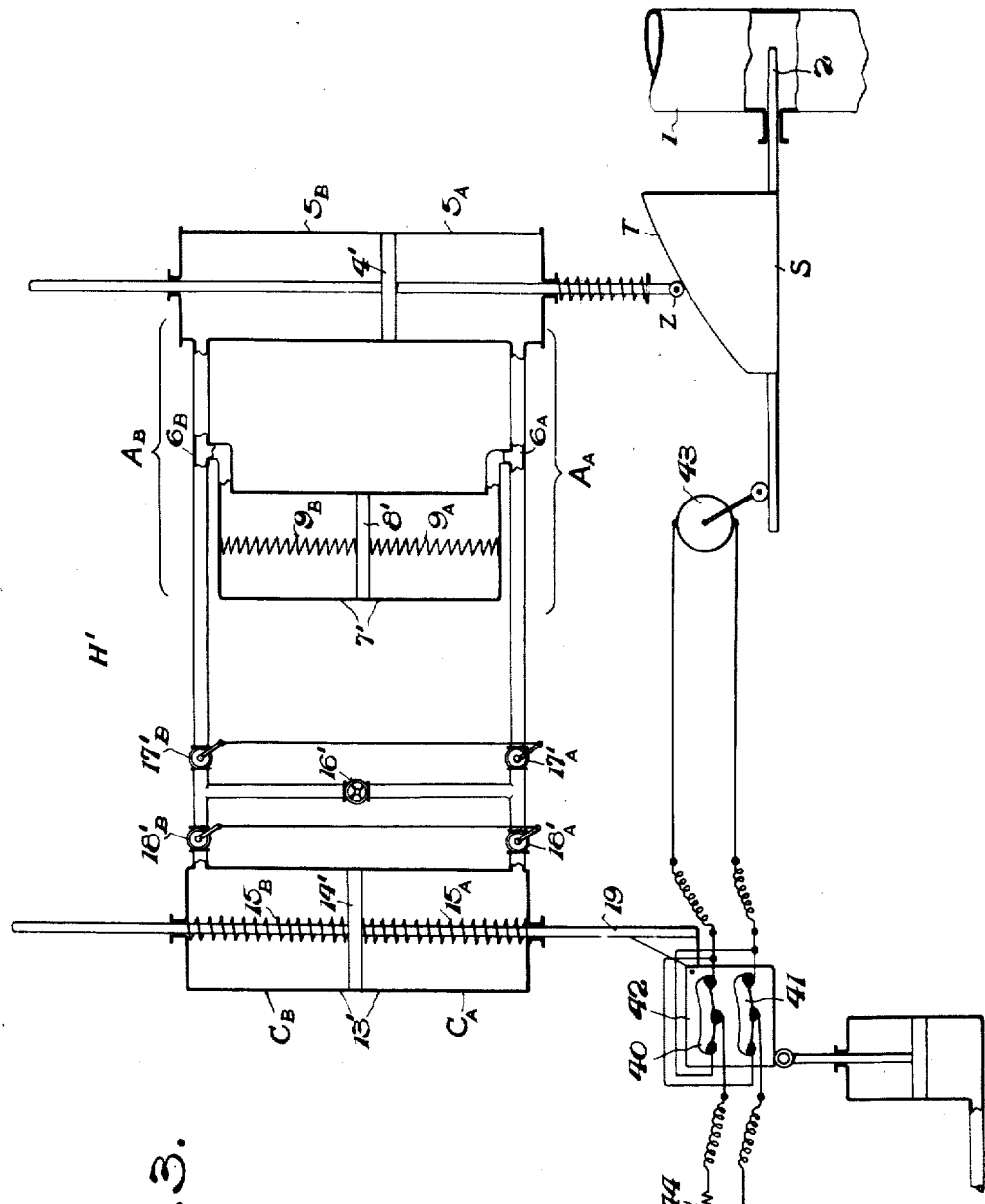

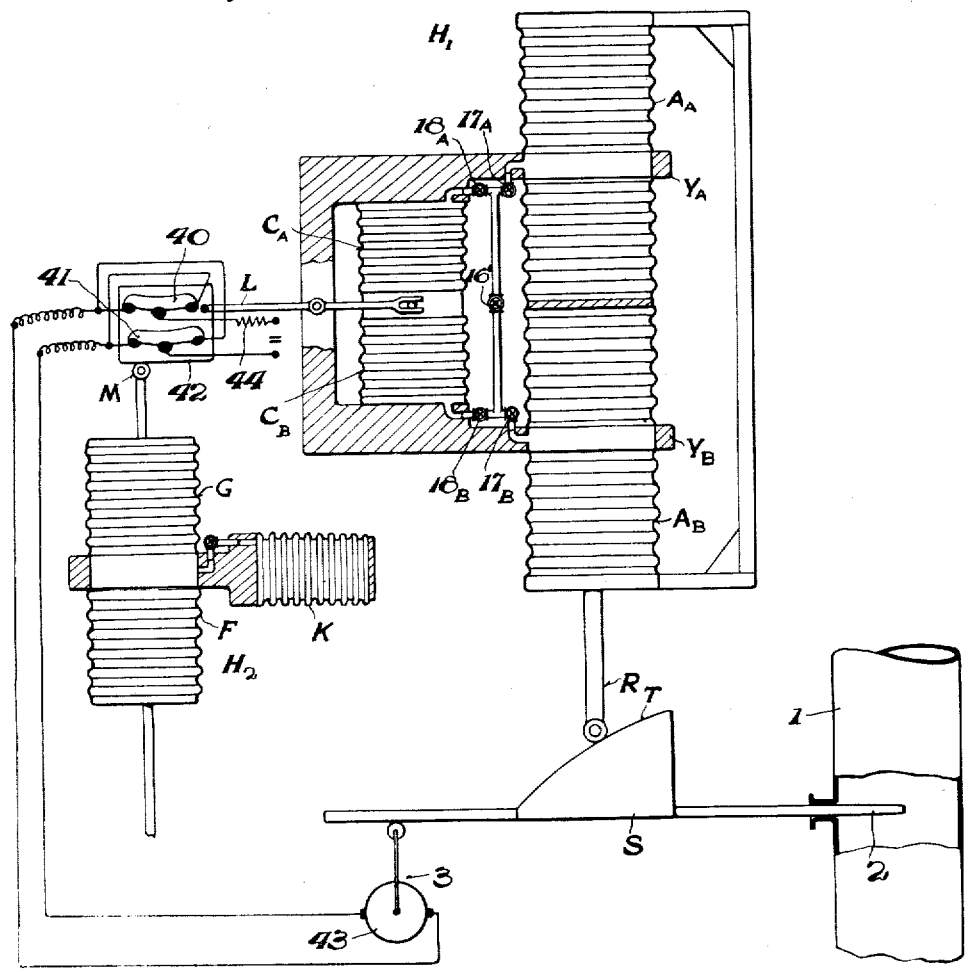

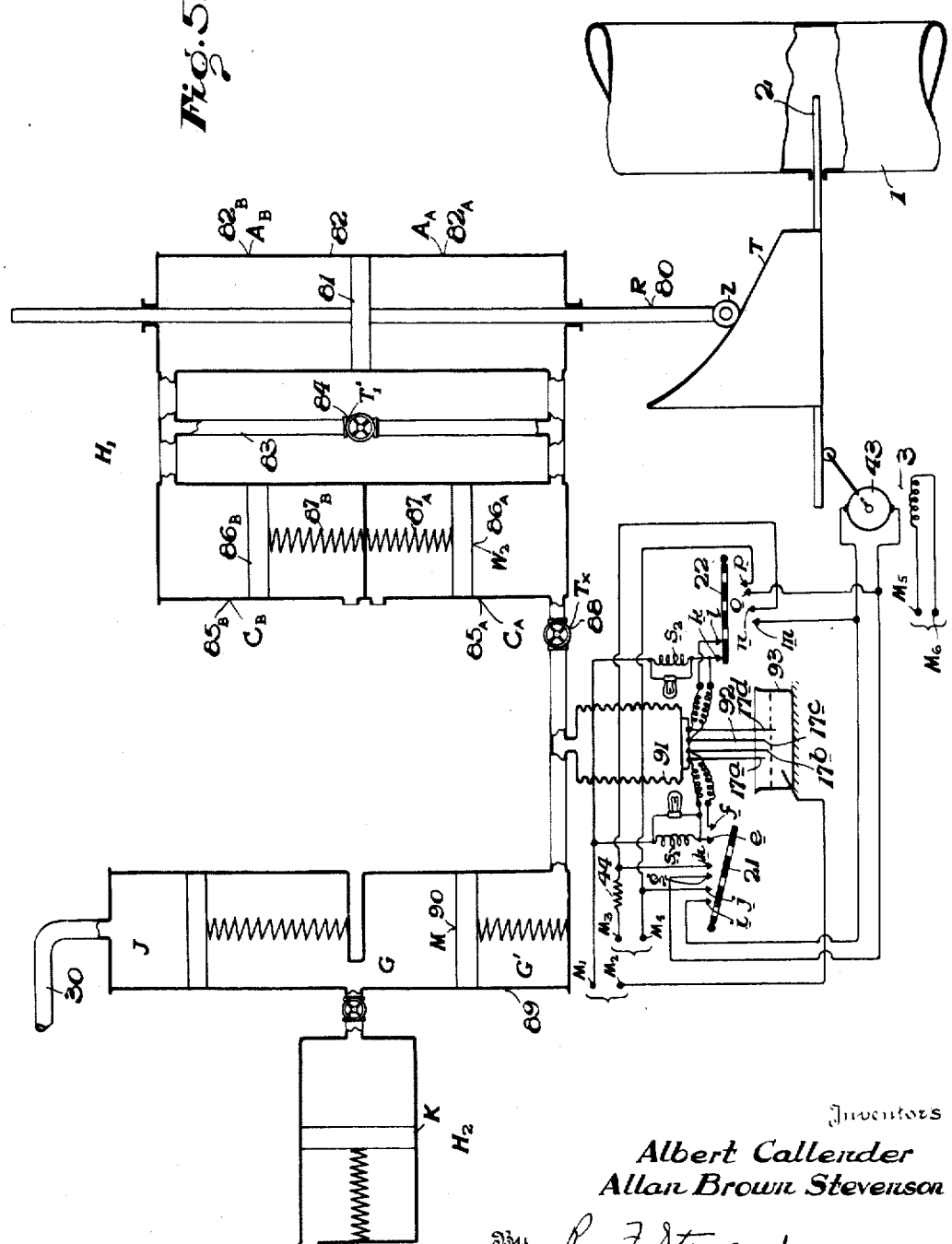

Patented Dec. 12, 1939

2,183,235

UNITED STATES PATENT OFFICE 2,183,235

AUTOMATIC CONTROL OF VARIABLE PHYSICAL CHARACTERISTICS

Albert Callender and Allan Brown Stevenson, Northwich, England, assignors to Imperial Chemical Industries Limited, a corporation of Great Britain Application March 3, 1936, Serial No. 66,974
In Great Britain March 8, 1935

25 Claims. (Cl. 236—1)

This invention relates to the automatic control of variable physical characteristics, for example, temperature or pressure, or any other characteristic which is to be maintained at a value or series of values of predetermined magnitude.

More particularly this invention relates to the automatic control of apparatus which have the following two devices:

(1) An indicator of characteristic which provides changes the magnitude of which is dependent upon changes in the value of the characteristic under control, either in the position of a member or in the pressure of a fluid. In the particular case in which the characteristic under control is a position or pressure, such position or pressure may form its own indicator of characteristic and be directly impressed upon the automatic control system.

(2) A compensating means, e. g. a steam valve, such that a definite displacement of its setting, from one position to another, corresponds to a definite change in the value of the compensating effect and which can be operated in one direction or the other by any reversible form of motor (servomotor) whose operation is directed by the automatic control apparatus.

In such apparatus there is a time lag between the time when the compensating means are operated and their effect as shown by the indicator. For instance when a pan is heated by means of steam, the compensating means may take the form of a valve on the steam supply pipe. Should the pan at any time get too hot the compensating valve will cut down the supply of steam but the temperature of the pan will not fall until the supply of steam has been restricted for a certain length of time characteristic of the apparatus, which will hereinafter be referred to as the time lag.

Now, it has been proposed to provide apparatus in which the steam valve is operated by a servomotor in such a way that when the pan is above the desired temperature the servomotor operates to turn the steam valve off while when it is below that temperature it operates to turn the steam valve on.

The cycle of operations in such an apparatus is as follows:

Firstly, some variation in the conditions results in the temperature in the pan starting to rise. The servomotor promptly operates to cut down the steam supply.

Owing to the time lag the temperature continues to rise. As a consequence the servomotor continues to cut down the steam supply. The steam supply is therefore cut down to an extent greater than necessary to correct the rise in temperature.

When therefore the temperature falls it falls below the desired temperature, and the above cycle repeats itself, but this time with the valve opening to compensate a fall in temperature instead of closing to compensate a rise.

The resultant effect is not to maintain the heat in the pan constant at a temperature but to cause it to oscillate about that temperature.

We have calculated that, if we wish to compensate for this time lag so that after every disturbance of the system the characteristic which we wish to control returns to the predetermined value with the least possible oscillation round it, we must control the characteristic in accordance with the following law:

If $V$=the effect of the compensating means
$\theta$=the variation from the predetermined value
$t$=time and $Z$=a function of $\theta$ and $t$ determined by the following equation:

$$\frac{dZ}{dt}+CZ=C\alpha\theta+\beta\frac{d\theta}{dt}$$

then the law can be expressed in the following equation:—

$$-V=k_1\int Zdt+k_2Z+k_3\frac{dZ}{dt} \qquad (1)$$

In the above equations $k_1$, $k_2$, $k_3$, $C$, $\alpha$ and $\beta$ are each a constant depending on the peculiarities of the apparatus under control.

The above control law represents conditions more ideal than is always necessary. For some applications it is sufficient if $Z=\theta$, giving the control law $$-V=k_1\int \theta dt+k_2\theta+k_3\frac{d\theta}{dt} \qquad (2)$$

but sometimes a sufficient degree of accuracy is given when $k_3=0$, giving the control law $$-V=k_1\int Zdt+k_2Z \qquad (3)$$

An object of this invention is to provide a fluid link between the means governing the servomotor and the compensating means and between the said means governing the servomotor and the indicator, so adapted that the compensating effect is varied according to law (1) or (2) propounded above. A further object is to provide a fluid link between the compensating means and the means governing the servomotor so adapted that the compensating effect is varied according to law (2) above.

Further objects will appear hereinafter.

These objects are accomplished by the following invention. We have found that we can control an apparatus of this type in accordance with law (3) if the means governing the servomotor are actuated by two relatively movable members or by the differential action of two pressures.

The movement of the first of these members (or if differential pressures are used the value of one of these pressures) is controlled by a hydraulic system, being responsive to the pressure of fluid in a container, which pressure can, by coupling means associated with the compensating means, be made to vary proportionally to the effect of the compensating means, while connected with this container through a throttle valve which is normally kept gagged there is another fluid container the pressure in which is set at a predetermined constant value. Further means are provided, e. g., a spring, which tend to return the movable member to a predetermined position. The movement of the second movable member (or the value of the second pressure) is controlled by a hydraulic system, being responsive to the pressure in a container which pressure can be made to vary proportionally with the variation of the indicator of characteristic. Connected with this container through a normally gagged throttle valve is an elastic container. Means are provided which tend to return the movable member to a predetermined position when the pressure in said first container is normal, i. e., when the characteristic under control has its proper value.

If the control law (2) is to be followed the second hydraulic system is omitted; the movement of the second movable member (or the value of the second pressure) being directly in proportion with the variation of the characteristic. The hydraulic system controlling the movement of the first movable member (or the value of the first pressure) is as follows:

In this case the container which controls the movement of the member (or the value of the pressure) is connected through two gagged valves with a container, the fluid in which has impressed on it pressures proportionate with the variation in the compensating effect. This second container is arranged so that its capacity varies by an amount sensibly proportional to the pressure within it, while a third container is connected through a third gagged throttle valve to a point between the two previously mentioned throttle valves. This third container is set at a constant predetermined pressure.

If the control is to be in accordance with the law (1) it is necessary to combine the two forms of apparatus described above. That is, the first movable member (or pressure) is controlled by the hydraulic system which controls it in the apparatus according to law (2), while the second movable member (or pressure) is controlled by the hydraulic system which controls it in the apparatus according to law (3).

With this general explanation, the invention will be described in more detail in connection with the accompanying drawings illustrating several specific embodiments, in which drawings, Fig. 1 is a diagram of an automatic control system suitable for the control of temperature, the switch or relay system being subject to the differential operation of two members;

Fig. 3 is a diagram of an automatic control system similar to that of Fig. 1, in which certain of the containers are divided into two variable compartments by a double-acting piston;

Fig. 4 is a diagram of an automatic control system similar to that of Fig. 3, in which spring bellows are used instead of springs, pistons and cylinders;

Figure 1:
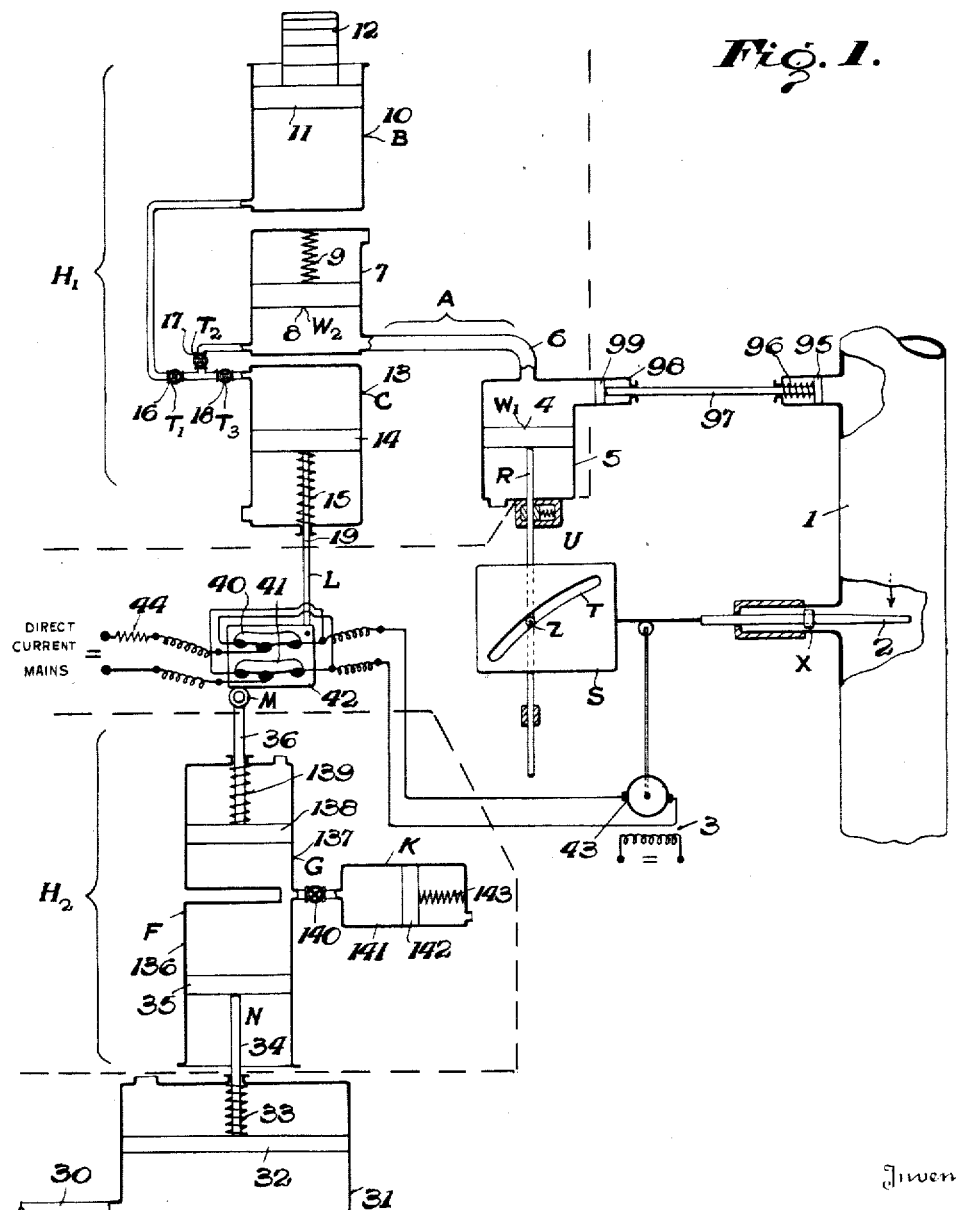

Fig. 5 is a diagram of an automatic control system in which the switch or relay system is subject to the differential action of a stationary conducting liquid surface and a 4-point electrical contact system of the kind described in the application of Albert Callender, Serial No. 26,696 (Patent No. 2,133,246, October 11, 1938), showing the mode of operation of said system in relation to the compensating means.

Fig. 6 is a diagram showing the mode of operation, in relation to the compensating means, of the 4-point contact system of Fig. 5.

In its most comprehensive form the system of our invention comprises two hydraulic systems $H_1$ and $H_2$, each utilising a suitable working fluid which fills a number of containers and pipes as hereinafter described. We prefer to use a sensibly incompressible fluid and the following description of our invention is based on the assumption that such is used. In the event of the working fluid being appreciably compressible, a control law represented by equations more complex than 1 and 2 is obtained. Such equations, however, may be restored to the form of Equations 1 and 2 by fixing certain walls in containers in the system, which walls are normally movable under spring loading. The yielding effect of these walls is then replaced by the compressibility of the working fluid, and the net result is the same as when using an incompressible working fluid.

At one end of the system $H_2$ there is either a member N (Fig. 1) or a container J (Fig. 2), while a container G of variable volume, with or without an associated member M which changes its position in accordance with changes in volume of the liquid contained within G is located at the other end of the system $H_2$, the arrangement being such that positional changes impressed upon N or pressure changes applied to J by the indicator of characteristic cause pressure changes in G and positional changes of M if this element is provided.

The compensating means is coupled to a member R at one end of the system $H_1$ in such a way (described later) that positional changes sensibly proportional to changes in the compensating effect brought about by displacements of the compensating means are impressed upon R. A container C of variable volume, with or without an associated member L which changes its position in accordance with the changes in volume of the liquid contained within C, is located at the other end of the system $H_1$, and the arrangement is such that the positional changes of R cause pressure changes in C and positional changes of L if this element is provided.

The invention requires that the changes associated with L or C shall follow closely (i. e. closely imitate) those associated with M or G as the case may be. To this end a relay system is provided whereby any slight deviation from a state of precise "following" causes a prime mover to operate the compensating means in that direction which, via the system $H_1$, will tend to re-establish the state of precise "following," a close approximation to which state is thus, on the whole, maintained.

Various relay mechanisms are available by which slight relative movements of the members L and M or small relative pressure differences between the containers C and G may be caused to operate the prime mover in the required direction, e. g. a slide valve or electrical contact system. Two particular examples for the case of relative movements are given later. It may be pointed out here that the hydraulic system consisting of $H_1$ and $H_2$ is quite independent of any hydraulic system that may be employed to operate the prime mover for the compensating means, or of any hydraulic coupling that may be used between R and the compensating means.

The systems $H_1$ and $H_2$ themselves will now be described.

The system $H_1$ comprises three containers A, B and C, the last being the container C previously mentioned. Container A has one movable wall $W_1$ attached to the aforementioned member R, and a second movable wall $W_2$ which takes up of its own accord a position dependent upon the pressure within the container A, the capacity of which is thus changed by an amount sensibly proportional to any difference from normal pressure of the liquid within it, the movements of R not being taken into account. $W_2$ may, for example, be a spring-loaded piston working in a cylinder forming part of A, or a spring bellows cylindrical in general form, forming part of A. Alternatively the movable wall $W_2$ may be replaced by a modified form of attachment between $W_1$ and R, for example an elastic coupling such as a compression-tension spring may be adapted to give the required effect. Container B has the property of maintaining a sensibly constant pressure upon the liquid within it, either by means similar to those just described (e. g. applying to a movable wall of B either a spring arranged to give an approximately constant load, or a weight), or by arranging that a surface of the liquid within container B itself is exposed to a substantially constant pressure, e. g. to atmospheric pressure. Container C has the property of exerting on the liquid within it an increase or decrease in pressure sensibly proportional to any increase or decrease in the volume of this liquid.

Container A is connected via normally gagged throttle valves $T_2$ and $T_1$ in series to container B. A point in the pipe between $T_2$ and $T_1$ is connected via a normally gagged throttle valve $T_3$ to container C.

The hydraulic system $H_2$, interposed between the indicator of characteristic and the hydraulic system $H_1$, comprises three containers, F, G and K. G is the same container as previously mentioned. In cases where the indicator of characteristic provides positional changes of a member N (as above described), N is attached to a movable wall of container F to produce approximately proportional changes in the volume of F. Each of the containers G and K has the property that any change in the pressure of the liquid within it is accompanied by an approximately proportional change in the volume of the container. G is connected directly to F, and K is connected with G via a normally gagged throttle valve. In cases where the indicator of characteristic provides changes in a pressure (as above described), this pressure is applied to the container J previously mentioned which shares the movable wall of a vessel F' (taking the place of F), which confers the property that the volume of the vessel suffers a change approximately proportional to the difference between the pressure in J and the pressure in F'.

The hydraulic system $H_2$ provides the relationship expressed in control Equation 2 cited above, and produces a temporarily exaggerated compensating effect whenever the value of the characteristic under control changes suddenly; such exaggeration dies away as leakage through the normally gagged throttle valve proceeds. For certain applications Equation 2 may be dispensed with, the system $H_2$ being omitted. An example is given later.

The whole apparatus is adjusted to control the characteristic to the desired value ($\theta=0$) by arranging that the relay system is quiescent (the prime mover then being at rest) when the position of L or the pressure in C corresponds to the equilibrium state of the system $H_1$ and when the position of M or the pressure in G corresponds to the equilibrium state of the system $H_2$ for $\theta=0$.

In order that the invention may be better understood typical cases will now be described by way of example and with reference to the accompanying drawings.

Referring to Fig. 1, in which the "following" is in respect of positional changes and in which broken lines indicate the boundaries of sections $H_1$ and $H_2$, the relay system etc., the supply of heating medium (e. g. steam) to the system the temperature of which is to be controlled is via a pipe 1 having a regulating valve 2 driven through reduction gearing (not shown) by a motor 3 whose operation is directed by the automatic control apparatus. Coupled to valve 2 is a piston 4 movable in cylinder 5. The coupling arrangement denoted by S, T, Z is described later. The piston 4 corresponds to member R of the general description, while the inner surface of the piston corresponds to $W_1$. From cylinder 5 a pipe 6 leads to cylinder 7 containing a piston 8($W_2$) loaded with spring 9, which exerts a pressure sensibly proportional to is displacement. The pipe 6 and the cylindrical chambers connected thereby together constitute container A.

A cylinder 10 containing a piston 11 loaded with weights 12 constitutes the container B, and cylinder 13 containing a piston 14 loaded with spring 15 constitutes container C. Normally gagged throttle valves 16, 17 and 18 correspond respectively to $T_1$, $T_2$ and $T_3$ previously mentioned. The portions of the connections between these throttle valves and the containers A, B, C are to be regarded as part thereof.

Piston 14 is connected to a rod 19 constituting member L of the general description. The whole of A, B and C, which constitutes the system $H_1$, is filled with oil or other suitable liquid.

The indicator of temperature is, in this example, in the form of a pressure indicator directly (i. e. without amplification) capable of exerting an appreciable force without seriously affecting the accuracy of its indicating movements. The pipe 30 conveys a pressure (e. g. a vapour pressure) dependent on the temperature of the system under control, to a cylinder 31 containing a piston 32 controlled by a spring 33.

The movements of piston rod 34 (member N of the general description) which are dependent on the behaviour of the temperature, are impressed upon piston 35 in cylinder 136(F) which is connected directly to cylinder 137(G) containing a piston 138 loaded by spring 139 and also, via a normally gagged throttle valve 140, to a cylinder 141(K) containing a piston 142 loaded by spring 143. The piston rod 36 of piston 138 constitutes the member M of the general description. The whole of F, G and K, which constitutes the system $H_2$, is filled with oil or other suitable liquid.

It is necessary that the motor 3 shall operate in such a way that L closely imitates the movements of M. This is brought about by means of a relay system comprising two mercury switches 40 and 41, supported as shown on a vertical plate 42, which is mounted so that it is tilted by any relative movement of points L and M. Whenever such relative movement sufficiently tilts the switches, a circuit conveying current to operate motor 3 in the appropriate direction is closed, and remains closed while the inclination of the switches is being rapidly reduced to a definitely smaller value by the movement of L brought about by displacement of oil in the system $H_1$. The speed of the motor 3 is such that the resulting rate of movement of L is always greater than the maximum expected rate of movement of M. Thus L is caused to follow M in a stepwise manner.

Instead of the tilting mercury switches 41 use may be made of a 4-point contact system as hereinafter described, member L carrying the four points and member M carrying a small vessel of a conducting liquid, e. g. mercury.

The operation consequent on a continuous change, say, increase, of value of the characteristic is that piston 32 rises proportionally to the change, lifting piston 35 and forcing the liquid in vessel F into vessel G so that member M rises and tilts the mercury switches to make contact on the right. The motor 3 runs to close the valve 2 and member L is lifted via the agency of the coupling device X, Z, T, R and the hydraulic system $H_1$ until contact of the mercury switches is broken. Repetition of this sequence of events will eventually overcome the rising value of the characteristic. A similar sequence occurs if the value of the characteristic is falling.

Figure 2:
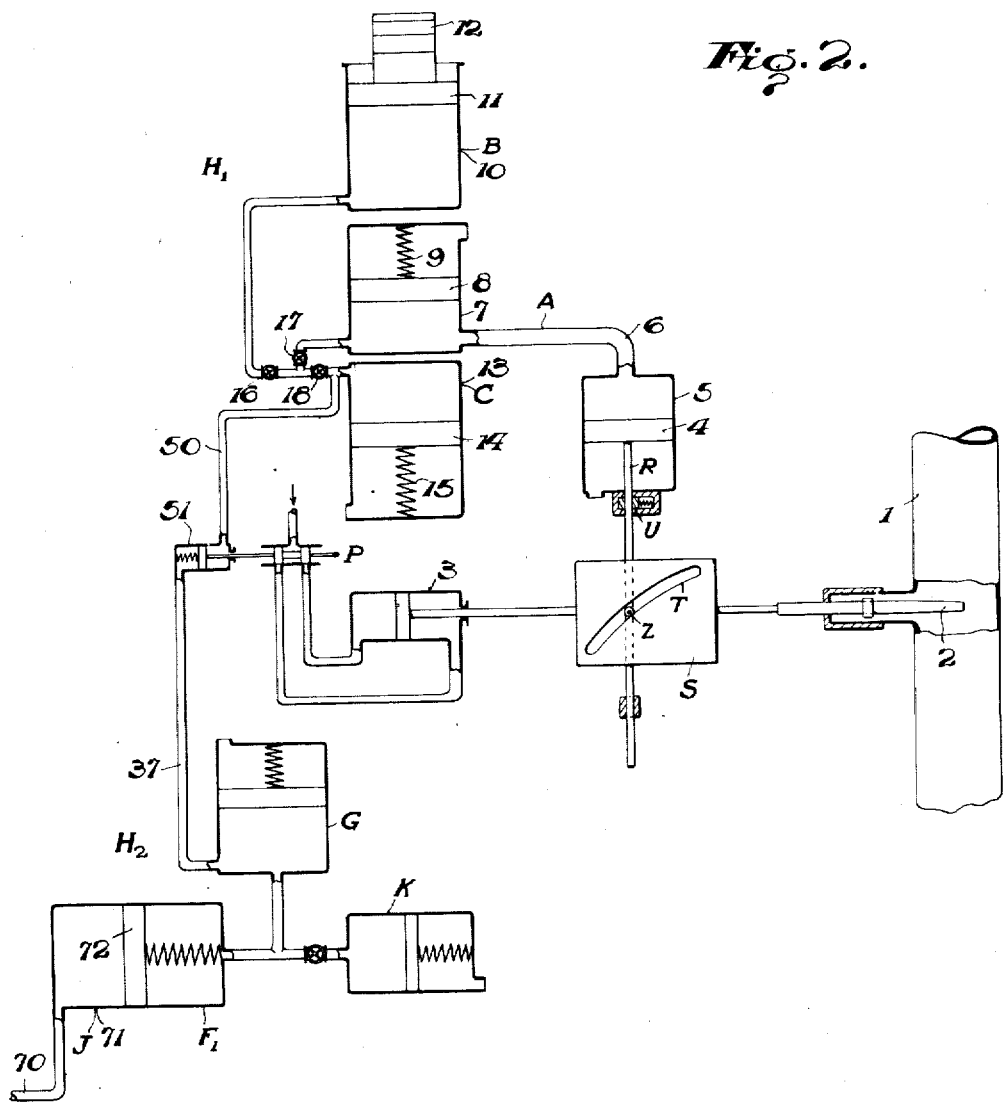
Fig. 2 is a diagram of an automatic control system similar to that of Fig. 1 with the exception of the switch or relay operating means, which is dependent upon the differential action of two opposed pressures.

Figure 2 illustrates an example of the basic form of the invention again applied to the control of temperature, but this time the "following" is in respect of pressure.

The apparatus is exactly similar to that of Figure 1 as far as the mention of the normally gagged throttle valves $T_1$, $T_2$ and $T_3$. Where the mechanism differs is as follows. Cylinder 13 is connected by pipe 50 to a differential pressure indicator 51, to which is also connected pipe 37, conveying the pressure from the container G. The differential pressure indicator 51 is such that by means of a diaphragm or spring-loaded piston it imparts to a point P a displacement, from a mean position, dependent upon the difference in pressure between the liquid in pipes 37 and 50. By utilising the movement of P, through a suitable relay system, the valve 2 may be caused to operate in such a way that the pressure in 50, i. e. in C, follows closely the pressure in pipe 37, i. e. a pressure varying with that in container G. If the value of the characteristic is rising the pressure applied through pipe 37 will increase and drive the piston of cylinder 51 towards the right. The piston rod P actuates the relay (such as that described with reference to Figure 1) to cause the servomotor to operate the valve 2 (Figure 1) in the direction of closing, and by means of the coupling device X, Z, T, R an increasing pressure is given to the fluid in container C and thus to the fluid in the pipe 50 connected thereto. This increased pressure balances that of the fluid in pipe 37 and checks the movement of the piston rod P, which is returned to such a point that the relay operates to stop the servomotor. This sequence is repeated until the compensating effect of the movement of valve 2 has overcome the rising value of the characteristic. A similar sequence occurs if the value of the characteristic is falling.

At the lower end of Fig. 2 is shown the form of the system $H_2$ where the indicator of characteristic provides changes in pressure which are of suitable magnitude for direct application to the system $H_2$. These pressure changes are fed by pipe 70 to the space J outside the piston 72 (movable wall) of the cylinder 71. Thence the description is as for the system $H_2$ in Fig. 1.

In a modified form of the system $H_1$ the containers A and C are duplicated, and the container B is omitted.

For convenience this modification is referred to as the bilateral form of the invention, in contradistinction to the already described forms which we may call unilateral.

In the bilateral form, the movable walls associated with each pair of containers are themselves arranged in pairs, so that a given increase in volume available in the one-half of a pair of containers is accompanied by a corresponding decrease in the other half, and vice versa. Thus each single-acting piston in the examples already given is replaced by a double-acting piston. Each end of each container is connected by pipes and throttle valves to the corresponding ends of the other containers as in the unilateral system. However, any pipes which in the unilateral system lead to a vessel maintained at constant pressure, do not here do so, but merely join their opposite items on the other half of the pair.

Particular examples of bilateral forms will now be given.

In Figure 3, the system $H_1$ of Figure 1 is shown in bilateral form, suffixes A and B being given to the two opposite halves of each pair of items. The single-acting piston 4 of Fig. 1 is replaced by a double-acting piston 4' and pipes 6A, 6B lead from opposite chambers 5A, 5B to container CA, CB containing a double-acting piston 14' loaded by springs 15A, 15B. Pairs of throttle valves 17'A, 17'B and 18'A, 18'B replace the single throttle valves 17 and 18 of Fig. 1, and throttle valve 16' controls a pipe connecting the two halves of system AA, AB. This pipe connection replaces container B of Fig. 1. The mode of operation of the system $H_1$ of Fig. 3 in its relation to the rest of the automatic control apparatus is similar to that described for $H_1$ in Fig. 1.

If the value of the characteristic is changing in such a direction that the member M rises to tilt the mercury switches 40, 41 and so operate the compensating means (servomotor), the latter is driven in such a direction as to tend to restore the desired value of the characteristic and, through the coupling device, the rod R is moved downwardly, thus causing the pressure in chamber CA to rise and the pressure in chamber CB to fall, the net effect being to cause the rod 19 to rise to restore the original setting of the mercury switches and to stop the servomotor. This sequence is repeated until the compensating effect due to successive operations of the compensating means has overcome the changing value of the characteristic. A similar sequence occurs if the value of the characteristic is changing in such a direction that the member M is falling.

In Fig. 4 is shown a bilateral arrangement similar to that of Fig. 3, in which spring bellows are used instead of springs, pistons and cylinders. Here also spring bellows are used for the system $H_2$. A length of expansion bellows, divided by a partition into two equal portions, is fixed to two fixed rings $Y_A$ and $Y_B$ at equal distances from the partition. The extreme end plates of the bellows are coupled by a stirrup to the member R actuated by the compensating means. Movements of the centre partition of another length of bellows divided into two parts $C_A$ and $C_B$, produce similar movements at L by means of a lever. The containers $A_A$, $A_B$ and $C_A$, $C_B$ are connected via the throttle valves 16', 17A, 17B, 18A, 18B as shown, in the manner already explained in connection with Fig. 3 in the second preceding paragraph. The system $H_2$ is shown in unilateral form but could be made bilateral if required. Since in system $H_2$ there are no containers at constant pressure, which would be eliminated by making the system bilateral, the bilateral form of $H_2$ has no practical advantages.

The operation of the arrangement shown in Fig. 4 is exactly similar in all respects to that already described in connection with Fig. 3, since the function of the outer stirrup coupled to member R is that of the piston 4', that of the inner containers $A_AA_B$ between the two fixed rings $Y_A$ and $Y_B$ is the same as cylinder 7' in Fig. 3, the movable walls 8' being identical with one another, and the spring bellows $C_A$ and $C_B$ have the joint properties of vessels $C_A$ and $C_B$ with springs 15A and 15B in Fig. 3.

In a further form of the invention, illustrated in Fig. 5, which may be regarded as partly bilateral, the operation of the prime mover is such that the pressure at a common point of the two hydraulic systems $H_1$ and $H_2$ is maintained as nearly constant as possible. This is attained by the provision of a relay system which, on slight departure of the said pressure from its arbitrarily chosen constant value, is caused to bring about operation of the compensating means in that direction which will tend to restore the pressure to this value, a close approximation to which value is thus, on the whole, maintained. This is tantamount to "following" or imitating a pressure that is being kept constant.

In this form of the invention, the member R (using the same notation as heretofore) is coupled to a movable wall shared by two containers $A_A$ and $A_B$ which are in communication with each other, and respectively in communication with two further containers $C_A$ and $C_B$ each of which has a spring loaded movable wall. In this special case, however, the path connecting $A_A$ and $A_B$ is alone constricted by a normally gagged throttle valve 84, the throttle valves equivalent to $T_2$ and $T_3$ being omitted, while $A_A$ and $A_B$ are themselves of a simplified form and the movable walls of $C_A$ and $C_B$ are independent.

The pressure at the common point, which is to be maintained approximately at an arbitrary constant value, is applied on the one hand through a normally gagged throttle valve Tx to $C_A$ and on the other hand to a container G' which shares the spring-loaded movable wall of container G of the hydraulic system $H_2$, which may take any of the forms previously described.

Departure of the pressure from its arbitrary constant value may bring about operation of the prime mover in the appropriate direction in any well known manner, for example via a relay system operated by a suitable pressure gauge. This arrangement gives control fully in accordance with Equations 1 and 2; an illustrative example is shown in Fig. 5.

Fig. 5 shows an arrangement of the two systems $H_1$ and $H_2$ which is partly bilateral. System $H_2$ is shown unilaterally, the indicator of characteristic providing changes in the pressure of a fluid led to container J, which in turn produces changes of pressure, in container 89. These changes in pressure are counterbalanced by the consequent movements of member R.

In a further form of the invention, illustrated in Fig. 5, which may be regarded as partly bilateral, the operation of the servomotor is such that the pressure at a common point of the two hydraulic systems $H_1$ and $H_2$ is maintained as nearly constant as possible. This is attained by the provision of a relay system which, on slight departure of said pressure from its arbitrarily chosen constant value, is caused to bring about operation of the compensating means in that direction which will tend to restore the pressure to this value, a close approximation to which value is thus, on the whole, maintained. In Fig. 5, 1 is the steam pipe, the flow of steam in which is controlled by the sluice valve 2 driven by reduction gear from the servomotor 43. On the valve 2 is mounted a cam T on which the rod R(80) rests. The cam T is so shaped that with any movement of the valve 2 the member R moves in proportion to the change of compensating effect which the movement of the valve 2 produces by varying the flow of steam through the pipe 1. The member R(80) is coupled to a movable wall 81 shared by two containers $A_A$(82A) and $A_B$(82B) which are in throttled communication with each other and respectively in free communication with two further containers $C_A$(85A) and $C_B$(85B), each of which has a spring loaded movable wall. In this special case, however, the path connecting $A_A$ and $A_B$ is alone constricted by a normally gagged throttle valve $T'_1$(84), the throttle valve equivalent to $T_2$ and $T_3$ being omitted, while $A_A$ and $A_B$ are themselves of a simplified form and the movable walls of $C_A$ and $C_B$, i. e. 86A and 86B are independent.

The pressure at the common point, which is to be maintained at an arbitrary constant value, is derived on the one hand through a normally gagged throttle valve Tx(38) from $C_A$, and on the other hand from a container G' which shares the spring loaded movable wall of container G of the hydraulic system $H_2$ which may take any of the forms previously described. Departure of the pressure from its arbitrary constant value may bring about the operation of the servomotor in the appropriate direction in any well known manner, for example via a relay system operated by a suitable pressure gauge. This arrangement gives control fully in accordance with the Equations 1 and 2. In Fig. 5 the member R to which the compensating means is coupled is here the rod 80 of piston 81 working in cylinder 82, the lower chamber 82A and the upper chamber 82B of 82 respectively constitute the containers $A_A$ and $A_B$ just described in general terms. 82A and 82B are in communication via pipe 83 and normally gagged throttle valve 84. Cylinders 85A and 85B are of similar type; 85A contains piston 86A, loaded by a spring 87A and communicates directly with 82A; 85B contains piston 86B loaded by spring 87B and communicates directly with 82B. 82A and 85A, which constitute containers $A_A$ and $C_A$ just described, communicate through normally gagged throttle valve 88 with the lower end of cylinder 89 which contains a spring loaded piston 90. The space in 89 above 90 corresponds to that in container G of the general description of the hydraulic system $H_2$, the rest of which is unchanged and is exemplified in Fig. 2. Spring bellows 91, also in direct communication with the lower end of cylinder 89, constitute a pressure gauge which operates a relay system to govern the movements of the servomotor so that the pressure within the bellows 91 is, on the whole, maintained approximately constant. The relay system attached to the spring bellows 91 is a 4-point contact system as described in the aforesaid application Serial No. 26,696 (Patent No. 2,133,246).

To the bottom of the bellows 91 which falls as the pressure in 91 rises, are attached four wires shown generally as 92 and individually as 17A, 17B, 17C and 17D, which are arranged so that they can dip into a small mercury cup 93. The points 17A and 17B are wired to a relay system comprising a solenoid $S_1$ and a switch 21 operated thereby, the points 17C and 17D are wired to a similar relay system comprising solenoid $S_2$ and a switch 22 operated thereby. The solenoids $S_1$ and $S_2$ are connected to the main terminal $M_1$ and the other main terminal $M_2$ is connected to the mercury 15 via contact 20. It will be understood that where necessary, e. g. to limit sparking at the contacts, amplification of the current flowing as a result of contact between points and the mercury, may be employed, although for the sake of simplicity details of amplification devices have not been included in Fig. 5.

When point 17A touches the mercury surface the circuit through the solenoid $S_1$ is completed and the switch 21 is lifted to close the 3 pairs of contacts e, f; g, h; i, j. Current then flows through the armature of the motor 43 operating the compensating means via the main terminal $M_3$, resistance 44 contacts g, h, motor armature and back via contact i, j, to main terminal $M_4$. This causes the valve 2 to move in the direction of closing, so that the cam T causes the member R to rise, thereby reducing the pressure on the right-hand side of the throttle valve 88 which reduces the pressure in 91 and causes the bellows 91 to contract. The motor 43 continues to run until the point 17B leaves the mercury surface, which breaks the circuit in the solenoid $S_1$ and causes the switch 21 to open, so bringing the motor 43 to rest.

The resistance 44 may be regarded as a permanently inserted starting resistance for the motor and is conveniently inserted in this position to prevent short circuiting across the mains of $M_3$ and $M_4$ due to possible accidental movements of the switches 21 and 22.

If the temperature variation is such that the pressure in bellows 91 falls, the bellows will contract and lift the point 17D, which is slightly lower than 17B, out of the mercury; solenoid $S_2$ is then de-energized and switch 22 drops to open contacts k, l, and close contacts m, n; o, p. This causes a current to flow from $M_3$ through resistance 44, contacts m and n, through the armature of motor 43 and back through contacts o and p to $M_4$, thus causing the motor 43 to turn in the opposite direction to the first case when the bellows 91 were expanded. The motor will continue to run until the increase of pressure caused by the movement of the valve 2 and consequently of R has leaked past the valve 88 sufficiently to cause the contact 17C, which is slightly lower than 17A, to touch the mercury. This again energizes the solenoid $S_2$ which opens the switch 22 and so stops the motor.

Main terminals $M_5$ and $M_6$ denote the terminals of the field winding of the motor. It is not necessary that the voltage across terminals $M_1$, $M_2$ should be the same as that across $M_3$, $M_4$ or $M_5$, $M_6$. The operation of this embodiment of the invention is as follows:

Assuming that the body under control becomes too hot due to an extra rush of steam through the pipe 1, this is reflected by an increase in pressure through the pipe 30 which causes an increase in pressure in the chamber J which is communicated to the top of the piston 90 and through the piston 90 to the chamber $G_1$ and the spring bellows 91. This causes the terminal 17A to contact with the mercury which brings into operation the switch 21 and sets the motor 43 turning to close the valve 2. This causes a corresponding rise in the member R which causes a fall in pressure in the cylinders 82 and $W_2$, which permits the pressure in the chamber $G_1$ (and consequently the bellows 91) to leak away into the chamber $C_A$ until the wire 17B has left the mercury. By the action of the springs 87A and 87B the pressure in chamber $C_A$ will slowly rise by leakage through the throttle valve 84, thereby again raising the pressure in 91, which will cause further contacts of 17A with the mercury and further motions of the valve 2 until such time as the piston 90 has returned to a position corresponding to the desired temperature. The summation of all these motions of the valve 2 gives us the control according to the law which we desire.

It will be understood that the 4-point contact system and the tilting mercury switches are merely alternative examples of suitable relay mechanism, and that any known mechanism may be used instead for the same purpose in any of the arrangements above described.

Further features of the invention relate to means for compensating for backlash or lost motion which may exist between the actual position or setting of the compensating means itself and whatever external part of, or drive to, the compensating means is utilised for coupling to the member R, and to means for obtaining a suitable compensating effect in cases where the compensating effect due to a given displacement of the compensating means is not proportional to that displacement.

Compensation for this backlash is arranged for by causing an interval of delay prior to commencement of the volume change of container A that is to be brought about by movement of the compensating means; such interval is, however, to occur only during each movement of the compensating means which is opposite in direction to the preceding movement and is to be sensibly equal to that interval during which the compensating means takes up the backlash. This end is attained by deliberately inserting an equivalent backlash anywhere in the connection to R and providing a brake so that the backlash provided is normally fully taken up one way or the other. If, however, the friction opposing motion of R is sufficiently great the brake becomes unnecessary.

Compensation for non-proportionality of effect is attained by using a connection which gives a volume change sensibly proportional to the change in the compensating effect rather than to the movement of the compensating means. This can be done by using a cam or any equivalent device.

Referring back to Fig. 1, these two features of the invention are exemplified diagrammatically.

The steam valve 2, operated by a motor 3 is left free, laterally, to rest on its seating (not shown), by the insertion of a sliding joint X. The rod R, which effects the volume changes of container A, is driven from a pin Z and is braked by a braking guide U. Any backlash at X will be nullified by providing that, in plate S, the slot T is of suitably greater width than the diameter of pin Z which it drives. In this way each time the valve operating motor commences to run in a reversed direction, movements of the valve 2 and of the rod R continue to be related in the desired manner. The braking guide U ensures that the backlash in rod R is always fully taken up in the correct way, without interference due to the hydraulic operating forces. Compensation for non-proportionality of effect is obtained by suitably shaping the slot T.

The electrical circuit for use with the tilting mercury switches is shown in Fig. 1.

According to their inclination, the two mercury switches 40, 41 shown in Fig. 1 connect a D. C. motor 43 (separately excited) so that it runs in one direction or the other. Any resistance 44 permanently inserted in the armature circuit should be where shown. Accidental short-circuiting of the mains via the switches is then impossible.

It is, however, not necessary to use electrical devices in the apparatus, either for the relay system or for the prime mover; instead slight departure from true positional "following" or slight changes of pressure difference in the case utilising pressure changes, may be caused to act directly upon a pilot valve system of any known type controlling the state of rest or direction of motion of a hydraulically operated prime mover.

In an extension of the system the volume of container A is further changed by an amount dependent upon any change in the magnitude of a further characteristic, hereinafter referred to as a causal characteristic, the variations of which may be expected to lead to variations of the characteristic to be controlled.

Referring to Fig. 1, if the pressure of the heating medium, e. g. steam, in the pipe I should rise (which would lead eventually, i. e. after an interval of time peculiar to the system under control, to an increase of temperature), a member 95, operated by this rise in pressure and controlled by a spring 96, is arranged to produce via the coupling rod 97 a decrease in the volume of container 98 by movement of the piston 99. This change in the volume of container A will tend to cause the control system to operate as though the eventual change of characteristic had taken place, although the latter has not yet been affected by the change of the causal characteristic. Thus, the control system anticipates the effect of variations of the causal characteristic and smoother control is obtained than if the basic system of Fig. 1 were alone employed.

It may be found superfluous in certain applications of the invention to use simultaneously the whole of any set of control apparatus, hereinbefore described in general terms; two particular simplifications will now be given:

(I) A system $H_1$ used alone, giving $Z=\theta$ in the control Equations 1 and 2.

(II) A system $H_2$ used in conjunction with a simplified form of the system $H_1$, which will give $k_3=O$ in the control Equation 1.

In (I) the omission of $H_2$ is effected, either by the identification of member M with member N, or by direct connection of container G to the pressure from the indicator of characteristic, which was previously connected to container J.

In (II) the system $H_1$ is simplified to a form in which the wall $W_2$ is made fixed, equivalent to making the spring loading of $W_2$ infinitely strong. Container A thus reduces to a simpler form and throttle valves $T_2$ and $T_3$ are rendered unnecessary and may be omitted.

Similar simplification may be desirable in the partly bilateral form hereinbefore described (exemplified in Fig. 6). The omission of the system $H_2$, effected in the manner described, with reference to (I) above, here also gives $Z=\theta$. The simplification to give $k_3=O$ lies in making the spring loading of the movable wall of container $C_A$ infinitely strong and in having throttle valve $T_X$ fully opened; these conditions are tantamount to omitting $T_X$ and $C_A$ from the system.

Various modifications of the systems previously described may be made in carrying out our invention, and all such modifications are intended to come within the scope of the appended claims in so far as they achieve to a useful degree the control laws expressed by Equations 1 and 2 hereinbefore set out.

We claim:—

1. Automatic control apparatus comprising an indicator of a physical property to be controlled, compensating means operable to maintain the desired value of said property, a reversible servomotor actuating said compensating means, a switch system controlling said servomotor, two relatively movable members controlling said switch system, a hydraulic system comprising a plurality of connected fluid containers, one of said relatively movable members being responsive to the pressure in one of said containers, the fluid in another of said containers being set at a predetermined constant pressure and the fluid in a third container having impressed upon it by means associated with said compensating means a pressure which is varied proportionately with the compensating effect, and a second hydraulic system comprising a plurality of connected fluid containers, the second of said relatively movable members being responsive to the pressure in one of said latter containers, the capacity of another of said latter containers being elastic and the fluid in the third of said latter containers having impressed upon it a pressure which is varied proportionately with variations of the indicator.

2. Automatic control apparatus comprising an indicator of a physical property to be controlled, compensating means operable to maintain the desired value of said property, a reversible servomotor actuating said compensating means, a relay system controlling said servomotor, two members, said relay system being subject to and controlled by the differential operation of said members, a hydraulic system connecting the first of said members and said compensating means, said hydraulic system comprising three containers, each of which is connected by a resistant path to a common junction point, said first member being responsive to the pressure in the first container, the fluid in the second container being set at a predetermind constant pressure and the fluid in the third container having impressed upon it, by coupling means associated with the compensating means, a pressure which is varied proportionately with the compensating effect, the capacity of the third container being elastic, and means connecting the second member and said indicator whereby said second member is responsive to changes in the value of the property under control.

3. A modification of the apparatus claimed in claim 2, in which the relay system is subject to the differential action of two pressures, one of which is derived from the fluid in the said first container and the other of which is derived from the property under control or an indicator thereof.

4. Automatic control apparatus as set out in claim 2 in which the means connecting the second member and said indicator include a second hydraulic system comprising a second set of three containers, of which the first and second containers are connected together by a resistant path and the first and third containers are connected together directly, said second member being responsive to the pressure in the first container of said second set, the capacity of said second container of said second set being elastic and the fluid in the third container of said second set having impressed upon it a pressure which is varied proportionately with the variations of the indicator.

5. A modification of the apparatus claimed in claim 2 in which the means connecting the second member and said indicator include a second hydraulic system comprising a second set of three containers, of which the first and second are connected together by a resistant path and the first and third are connected together directly, said second member being responsive to the pressure in the first container of said second set, the capacity of the third container of said second set being elastic and the fluid in the third container of said second set having impressed upon it a pressure which is varied proportionately with the variations of the indicator, and in which the relay system is controlled by a single member subject to the differential action of two opposed pressures, one of which is derived from the fluid in the first container of the first set and the other of which is derived from the fluid in the first container of the second set.

6. Automatic control apparatus comprising an indicator of a physical property to be controlled, compensating means operable to maintain the desired value of said property, a reversible servomotor actuating said compensating means, a relay system controlling said servomotor, two members, said relay system being subject to and controlled by the differential operation of said members, a hydraulic system connecting the first of said members and said compensating means, said hydraulic system comprising at least two containers, each of which is divided into two variable compartments by a double-acting piston, one for each container, said first member being responsive to the pressure difference between the fluids in the opposite compartments of the first container, one compartment of the first container being directly connected with one compartment of the second container, the remaining two compartments of said containers being connected by a resistant path, the piston of the first container being spring-loaded to ensure return of the piston to a predetermined position and the piston of the second container having impressed upon it, by means of a coupling device associated with the compensating means, a displacement which is varied proportionately with the compensating effect, and means connecting the second member and said indicator whereby said second member is responsive to changes in the value of the property under control.

7. Automatic control apparatus as set out in claim 6 in which the means connecting the second member and said indicator include a second hydraulic system comprising a second set of three containers, of which the first and second are connected together by a resistant path and the first and third are connected together directly, said second member being responsive to the pressure in the first container of the second set, the capacity of the second container of the second set being elastic and the fluid in the third container of the second set having impressed upon it a pressure which is varied proportionately with the variations of the indicator.

8. A modification of the apparatus claimed in claim 6, in which the first container takes the form of a single container of elastic capacity directly connected to a compartment of the second container whose two compartments are themselves connected by a resistant path, and in which the relay system is subject to a member responsive to the resultant of two combined pressures, the arrangement being such that the one pressure increases as the other decreases, and vice versa, one of said pressures being derived from the fluid in the first container and the other being derived from the property under control.

9. A modification of the apparatus claimed in claim 6 in which the first container comprises two compartments having separate spring loaded pistons, and in which the relay system is subject to a member responsive to the resultant of two combined pressures, the arrangement being such that the one pressure increases as the other decreases, and vice versa, one of said pressures being derived from the fluid in one compartment of said first container and the other being derived from the property under control, the connection between the relay system and first container being via a resistant path.

10. Apparatus as claimed in claim 6, in which the second container comprises in addition to its two main compartments, an additional pair of subsidiary compartments separated by a spring loaded double-acting piston and in direct communication respectively with said two main compartments, of the second container and in which the said main compartments are each connected by one of a pair of resistant paths to a pair of common points and the two compartments of the first container are connected to the same common points by a pair of resistant paths, while the said common points are themselves connected by a resistant path.

11. Automatic control apparatus as set out in claim 6, in which the means connecting the second member and said indicator include a second hydraulic system comprising a second set of three containers, of which the first and second are connected together by a resistant path and the first and third are connected together directly, said second member being responsive to the pressure in the first container of the second set, the capacity of the second container of the second set being elastic and the fluid in the third container of the second set having impressed upon it a pressure which is varied proportionately with the variations of the indicator, and in which the second container of the first set comprises an additional pair of compartments separated from a spring loaded double-acting piston and in direct communication respectively with the respective compartments of the second container of the first set, and in which the said compartments of the second container of the first set are each connected by one of a pair of resistant paths to a pair of common points and the two compartments of the first container are connected to the same common points by a pair of resistant paths, while the said common points are themselves connected by a resistant path.

12. Apparatus as claimed in claim 6 in which the two compartments of the second container take the form of a pair of spring bellows each anchored at one end and each secured at the other end to the coupling device so that the total volume of the two compartments remains constant.

13. Apparatus as claimed in claim 6, in which the second container comprises two main compartments and an additional pair of compartments separated by a spring loaded double-acting piston and in direct communication respectively with the main compartments, of said second container and in which the said main compartments are each connected by one of a pair of resistant paths to a pair of common points and the two compartments of the first container are connected to the same common points by a pair of resistant paths, while the said common points are themselves connected by a resistant path, and in which the additional pair of compartments of the first container takes the form of a spring bellows divided by a solid wall into two compartments which are in direct communication respectively with the respective compartments of the second container.

14. Apparatus as claimed in claim 6, in which the first container takes the form of a spring bellows divided by a solid wall into two compartments.

15. Apparatus as claimed in claim 6, in which the means connecting the second member and said indicator include a second hydraulic system comprising a second set of three containers, of which the first and second containers of said second set are connected together by a resistant path and the first and third containers of said second set are connected together directly, said second member being responsive to the pressure in the first container of said second set, the capacity of the second container of said second set being elastic and the fluid in the third container of said second set has impressed upon it a pressure which is varied proportionately with the variations of the indicator, and in which one or more of the containers of said second set takes the form of a spring bellows.

16. Apparatus as claimed in claim 6 in which the relay system, instead of being subject to the differential action of two members, is subject to the differential action of two pressures, one of which is derived from the fluid in a compartment of the first container and the other of which is derived from the property under control or an indicator thereof.

17. Apparatus as claimed in claim 2 in which backlash between the compensating means and its connection to the coupling means is compensated by inserting an equivalent backlash in the coupling means.

18. Apparatus as claimed in claim 2, in which the coupling means includes a suitable shaped cam or equivalent device adapted to produce a volume change of container which is sensibly proportional to the change in the compensating effect, in cases where the displacement of the compensating means and the compensating effect thereof are not proportional.

19. Apparatus as claimed in claim 2 in which means are provided for impressing upon the fluid in the first container a pressure which is dependent upon the magnitude of a casual property as hereinbefore defined.

20. Apparatus as claimed in claim 2, in which the relay system comprises a pair of tilting mercury switches operated by the differential action of the said two members.

21. Apparatus as claimed in claim 2 in which the relay system comprises a 4-point contact system operated by the differential action of the said two members.

22. A system for the automatic control of a physical quantity comprising means responsive to changes in the quantity, compensating means, a reversible servomotor actuating said compensating means, means for controlling said servomotor responsive to the differential operation of the means responsive to changes in the quantity and means responsive to the action of the compensating means, and a coupling device between the compensating means and the means for controlling the servomotor, comprising fluid within at least two interconnected containers and means for giving to a wall of one of said containers displacements proportional to changes in the compensating effect due to displacements of the compensating means, together with means tending gradually to restore the resulting pressure to a standard value.

23. Automatic control apparatus comprising an indicator of a physical property to be controlled, compensating means operable to maintain the desired value of said property, a reversible servomotor actuating said compensating means, means for controlling said servomotor responsive to the differential operation of two members, a hydraulic system connecting the first of said members and said compensating means, said hydraulic system comprising three containers of which the first two are connected together by a resistant path and the first and the third are connected together directly, said first member being responsive to the pressure in the first container, the fluid in the second container being set at a predetermined constant pressure and the fluid in the third container having impressed upon it, by coupling means associated with the compensating means, a pressure which is varied proportionately with the compensating effect, and a second hydraulic system connecting the second member and the indicator, said second hydraulic system comprising three containers of which the first two are connected together by a resistant path and the first and the third are connected together directly, said second member being responsive to the pressure in the first container, the capacity of the second container being elastic and the fluid in the third container having impressed upon it a pressure which is varied proportionately with the variations of the indicator.

24. Apparatus as set forth in claim 23, in which the servomotor is controlled by a single member subject to the differential action of two opposed pressures, one of which is derived from the fluid in the first container of the first hydraulic system and the other of which is derived from the fluid in the first container of the second hydraulic system.

25. Apparatus as claimed in claim 6, in which the second container comprises in addition to its two main compartments, two additional subsidiary compartments, and in which the two main compartments are formed as a pair of spring bellows, each anchored at one end and each secured at the other end to the coupling device, so that the total volume of the two compartments of said second container remains constant, the main compartments of said second container and the subsidiary compartments being arranged coaxially and are anchored to common supports.

ALBERT CALLENDER.
ALLAN BROWN STEVENSON.

CERTIFICATE OF CORRECTION.

Patent No. 2,183,235. December 12, 1939.

ALBERT CALLENDER, ET AL.

It is hereby certified that error appears in the printed specification of the above numbered patent requiring correction as follows: Page 1, second column, line 55, for "(2)" read --(3)--; page 2, second column, lines 25-27, strike out "Fig. 6 is a diagram showing the mode of operation, in relation to the compensating means, of the 4-point contact system of Fig. 5."; page 9, second column, line 16, claim 19, for the word "casual" read --causal--; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.

subject to the differential action of two opposed pressures, one of which is derived from the fluid in the first container of the first hydraulic system and the other of which is derived from the fluid in the first container of the second hydraulic system.

25. Apparatus as claimed in claim 6, in which the second container comprises in addition to its two main compartments, two additional subsidiary compartments, and in which the two main compartments are formed as a pair of spring bellows, each anchored at one end and each secured at the other end to the coupling device, so that the total volume of the two compartments of said second container remains constant, the main compartments of said second container and the subsidiary compartments being arranged coaxially and are anchored to common supports.

ALBERT CALLENDER.
ALLAN BROWN STEVENSON.

CERTIFICATE OF CORRECTION.

Patent No. 2,183,235. December 12, 1939.

ALBERT CALLENDER, ET AL.

It is hereby certified that error appears in the printed specification of the above numbered patent requiring correction as follows: Page 1, second column, line 55, for "(2)" read --(3)--; page 2, second column, lines 25-27, strike out "Fig. 6 is a diagram showing the mode of operation, in relation to the compensating means, of the 4-point contact system of Fig. 5."; page 9, second column, line 16, claim 19, for the word "casual" read --causal--; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.